United States Patent
Erman et al.

(10) Patent No.: US 11,848,863 B2
(45) Date of Patent: Dec. 19, 2023

(54) UNIVERSAL NETWORK PROTOCOL ENCAPSULATION AND METHODS FOR TRANSMITTING DATA

(71) Applicant: Nokia Solutions and Networks Oy, Espoo (FI)

(72) Inventors: Bilgehan Erman, Weehawken, NJ (US); Andrea Francini, Rumson, NJ (US); Edward Grinshpun, Freehold, NJ (US); Raymond Miller, Murray Hill, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 125 days.

(21) Appl. No.: 16/999,660

(22) Filed: Aug. 21, 2020

(65) Prior Publication Data

US 2021/0135988 A1 May 6, 2021

Related U.S. Application Data

(60) Provisional application No. 62/930,815, filed on Nov. 5, 2019.

(51) Int. Cl.
*H04L 45/74* (2022.01)
*H04L 47/34* (2022.01)

(52) U.S. Cl.
CPC .............. *H04L 45/74* (2013.01); *H04L 47/34* (2013.01); *H04L 2212/00* (2013.01)

(58) Field of Classification Search
CPC ..................................................... H04L 45/74
See application file for complete search history.

(56) References Cited

U.S. PATENT DOCUMENTS

| | | | |
|---|---|---|---|
| 7,596,146 B2* | 9/2009 | Lothberg | H04L 63/0272 713/160 |
| 10,044,581 B1* | 8/2018 | Russell | H04L 43/08 |
| 2009/0300327 A1* | 12/2009 | Omtzigt | G06F 15/17381 712/42 |
| 2012/0300747 A1* | 11/2012 | Westberg | H04L 65/1016 370/328 |
| 2015/0334009 A1* | 11/2015 | Clark | H04L 12/4633 370/252 |

(Continued)

OTHER PUBLICATIONS

Excerpts from Chapters 2, 4-6, 9 and 12 of "Network Problems and Solutions," by R. White et al., Addison-Wesley Professional, 2018.

(Continued)

*Primary Examiner* — Edan Orgad
*Assistant Examiner* — Won Tae C Kim
(74) *Attorney, Agent, or Firm* — Harness, Dickey & Pierce, P.L.C.

(57) ABSTRACT

A network node configured to transmit packets to a destination node in a packet network, includes at least one processor and at least one memory including computer program code. The at least one memory and the computer program code are configured to, with the at least one processor, cause the network node to: assemble at least a first packet including a plurality of data units, each of the plurality of data units being grouped into one of a connection group, a network function group or an application group; and transmit the first packet to the destination node.

20 Claims, 4 Drawing Sheets

(56) References Cited

U.S. PATENT DOCUMENTS

2016/0308769 A1* 10/2016 VerSteeg ............. H04L 43/0894
2019/0182842 A1*  6/2019 Hu ........................ H04L 5/0066
2021/0176172 A1*  6/2021 Zhang ................. H04L 12/1886

OTHER PUBLICATIONS

"ETSI TS 138 425 V15.4.0; Technical Specification; 5G; NG-RAN; NR user plane protocol (3GPP TS 38.425 version 15.4.0 Release 15)" published on Apr. 2019.

* cited by examiner

UNIVERSAL NETWORK PROTOCOL ENCAPSULATION AND METHODS FOR TRANSMITTING DATA

CROSS-REFERENCE TO RELATED APPLICATIONS

This application claims priority under 35 U.S.C. § 119 to U.S. Provisional Application No. 62/930,815, filed on Nov. 5, 2019, the entire contents of which are incorporated herein by reference.

BACKGROUND

In packet networks, messages are sent between nodes in the form of packets. A packet may have a variable length and may also have a maximum length. Packets may also have defined or predefined data encapsulation rules that describe network control and application related data fields. Generally, packets may be sent from a node asynchronously at any time without coordination with other nodes; however, there are also network implementations where nodes are time-synchronized for temporal control of packet transmission.

SUMMARY

One or more example embodiments provide methods for grouping and/or classifying data units in a message or packet as "connection," "network function," and "application" with different encapsulation rules.

One or more example embodiments provide methods for using "network identifier" as the top-level primary key for determination of the remainder of the message context.

One or more example embodiments provide methods for making a more uniform message encapsulation structure with minimal set of rules available to all or substantially all protocols above physical layer.

One or more example embodiments provide message tagging methods that may reduce control field overhead in network utilization.

One or more example embodiments provide methods for eliminating delayed start of flow sessions in case of packet loss by sending "unknown tag" responses from a destination node to the source node if no record exists for the tag in the tagged-message.

One or more example embodiments provide methods for assisting memory management for tag records at forwarding nodes by sending a "maximum flow tagged interval" indication by the source node.

At least one example embodiment provides a method for packet transmission between a source node and a destination node in a packet network, the method comprising: assembling at least a first packet including a plurality of data units, each of the plurality of data units being grouped into one of a connection group, a network function group or an application group; and transmitting the first packet to the destination node.

At least one example embodiment provides a non-transitory computer-readable medium storing computer-executable instructions that, when executed by at least one processor at a network node, cause the network node to perform a method for packet transmission between the network node and a destination node in a packet network, the method comprising: assembling at least a first packet including a plurality of data units, each of the plurality of data units being grouped into one of a connection group, a network function group or an application group; and transmitting the first packet to the destination node.

At least one example embodiment provides a network node configured to transmit packets to a destination node in a packet network. The network node includes at least one processor and at least one memory including computer program code. The at least one memory and the computer program code are configured to, with the at least one processor, cause the network node to: assemble at least a first packet including a plurality of data units, each of the plurality of data units being grouped into one of a connection group, a network function group or an application group; and transmit the first packet to the destination node.

At least one example embodiment provides a network node configured to transmit packets to a destination node in a packet network, the network node comprising: means for assembling at least a first packet including a plurality of data units, each of the plurality of data units being grouped into one of a connection group, a network function group or an application group; and means for transmitting the first packet to the destination node.

According to one or more example embodiments, each data unit, among the plurality of data units, may include: a type field indicating whether the data unit is grouped into the connection group, the network function group or the application group; a length field indicating a bit length of a value field; and the value field including a payload of the data unit. The type field may identify a type instance of the data unit.

Data units in the connection group may include at least one of identifiers, routes or tags associated with a flow of packets between the source node and the destination node.

The first packet may be an initial packet transmitted from the source node to the destination node, and the plurality of data units included in the first packet may include at least a network identifier data unit, a destination endpoint identifier data unit, a source endpoint identifier data unit and a flow tag data unit.

The method may further include: assembling a second packet for transmission to the destination node, wherein the second packet includes the flow tag data unit, and the second packet does not include the network identifier data unit, the destination endpoint identifier data unit or the source endpoint identifier data unit; and transmitting the second packet to the destination node.

The flow tag data unit included in the second packet may include a flow tag identifying a packet flow including the first packet and the second packet. The method may further include receiving an unknown tag response from the destination node, the unknown tag response indicating that a record corresponding to the flow tag included in the second packet does not exist at the destination node.

The plurality of data units may be arranged as a sequence of data units; the plurality of data units may further include at least one of a network state data unit, a channel data unit or a routing vector data unit; and the at least one of the network state data unit, the channel data unit or the routing vector data unit may be arranged after the network identifier data unit, the destination endpoint identifier data unit, the source endpoint identifier data unit and the flow tag data unit in the sequence of data units.

The at least one memory and the computer program code may be configured to, with the at least one processor, cause the network node to: assemble a second packet for transmission to the destination node, wherein the second packet includes the flow tag data unit, and the second packet does not include the network identifier data unit, the destination endpoint identifier data unit or the source endpoint identifier data unit; and transmit the second packet to the destination node.

The flow tag data unit included in the second packet may include a flow tag identifying a packet flow including the first packet and the second packet; and the at least one memory and the computer program code may be configured to, with the at least one processor, cause the network node to receive an unknown tag response from the destination node, the unknown tag response indicating that a record corresponding to the flow tag included in the second packet does not exist at the destination node.

BRIEF DESCRIPTION OF THE DRAWINGS

Example embodiments will become more fully understood from the detailed description given herein below and from the accompanying drawings, wherein like elements are represented by like reference numerals, which are given by way of illustration only and thus are not limiting of this disclosure.

Figure 1:
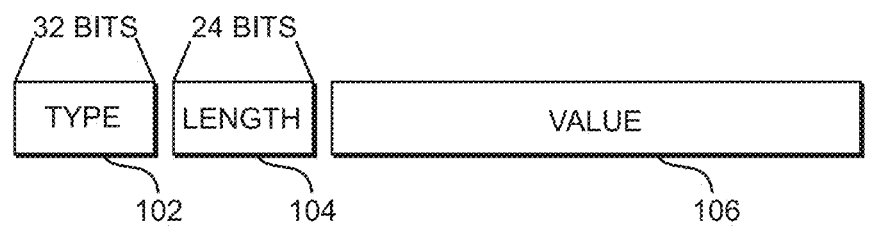
FIG. 1 is a diagram illustrating an example high level structure of a universal network protocol encapsulation (universal-NPE) formatted data unit according to example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Within the last 40 years, both hardware-level computing power and bandwidth of network connections have increased close to three orders of magnitude, and this trend is continuing. Meanwhile, the complexity of network operation has increased to the point that it has become relatively difficult for human operators to manage—such as for realization of sub-second instantiation of virtual networks and network slices.

One or more example embodiments describe methods for encapsulating data fields of messages sent in packet networks.

One or more example embodiments also relate to transmission of data between nodes in packet networks.

One or more example embodiments relate to standardization rules for formatting messages for transmission in a packet network.

A packet network is composed of nodes (e.g., hosts, such as computers or other networked electronic devices, routers, switches, etc.). In at least some cases, a network node (or node) represents a network transit function that forwards packets between its ports, which are the access points of the node. Links connect to the ports to interconnect nodes. Series of connected links form a path and interconnected nodes form a network topology.

As mentioned above, packets may have variable lengths and a maximum length. Packets may also have defined or predefined data encapsulation rules that describe network control and application related data fields. Generally, packets may be sent from a node asynchronously at any time without coordination with other nodes; however, there are also network implementations where nodes are time-synchronized for temporal control of packet transmission.

Encapsulation refers to the framework and mechanics that surround the data related to network protocols. In the context of one or more example embodiments, encapsulation is not assumed to be related to operational rules and semantics of network protocols.

Network nodes that send and receive packets have unique identifiers. The uniqueness of the identifiers may be relative to a specific context. Nodes may also receive packets sent to a shared destination identifier.

In packet networks, a flow is a set of packets that may require differential (from other packets) treatment by the network. Flows may be identified by IP 6-tuple, by specific application, by network endpoints of encrypted SSH tunnel (aggregate of many non-distinguishable flows), and by other techniques.

Procedural rules of packet transmissions are determined by protocol definitions. Network-wide administrative policies may alter the procedural rules dynamically.

Packets waiting for transmission may be buffered in queues. When transmitting packets, nodes may follow an administered policy to schedule packet transmission with different priorities. Nodes may alter packet flows by dropping or delaying packets to police the input rate, or to smooth out the transmission rate.

As packet transmission protocols in use have aged, they have fallen out of step with many aspects of the networks that have also been changing in the meantime (e.g., scale, bandwidth, dynamism, agility, and/or virtualization). Thus, it has become non-trivial to change and update packet data field formats because of standardization related interdependencies, and because of hardware-bound calcified structures.

More recently, virtualization techniques have been introduced. The evolution of these virtualization techniques is already transforming the way networks operate in significant ways. One of these transformations is the growing dynamism in the creation and control of new instances of virtual networks. A much faster paced control of the network resources requires advanced optimization across protocol layers and across different control domains. For example, if 100 network slices are being created on a common set of physical network entities, one cannot simply divide resources in 100 ways and allocate them to each slice in a static fashion. Instead, some form of resource sharing scheme must be put in place to improve and/or optimize the total utilization of the physical resources. For implementing these types of complex procedures efficiently, it may be necessary to have vertical transparency cutting through protocol layers including network slicing and application context—always within the confines of security constraints.

With the advances in cognitive techniques for autonomous network operation and management, network resource control loops must now be executed at much smaller time scales, and the procedures must be driven by much more detailed information about the status of the network. To support these trends, message encapsulations used for packet transmission may need to allow for carrying any information needed by the control plane within messages.

Technological advances in various industrial dimensions require new network services, especially low latency network services, as key enablers—examples include factory automation, autonomous vehicles, etc. However, achieving ultra-low-latency packet transmission is a formidable challenge in shared packet networks, especially those that extend beyond the boundaries of local area networks (LANs). The existing family of protocols evolved in their limited functional space and they have been required to operate stacked up on top of one another. These types of isolations induce complexities that inhibit the operational agility that is required in the advanced new environment.

As mentioned above, one or more example embodiments describe methods for encapsulating and/or transmitting messages sent in packet networks. In at least some instances, encapsulation methods according to example embodiments may be referred to as universal network protocol encapsulation (universal-NPE), network protocol encapsulation, or NPE for short for readability.

One or more example embodiments bring the requirements of the network control plane to the forefront intending to end the absence of many needed capabilities in message encapsulations.

One or more example embodiments may provide one or more of the following:
1. Messaging capability in relatively large-scale flat network architectures where link layer protocols may scale to support edge-to-edge, ultra-low latency communications;
2. Vertical context transparency of protocols for autonomous network control and/or dynamic improvement or optimization;
3. Explicit identification of virtual networks and/or network slices at the messaging level;
4. Increased throughput efficiency via message tagging to summarize control plane information; and/or
5. Capability to represent any data in packet transmission required by any protocol or control plane function.

One or more example embodiments may also introduce one or more of the following concepts:

1. Grouping message data units in at least three categories (e.g., "connection," "network function," and "application"), each with different encapsulation rules;
2. Using a "network identifier" as the top-level primary key to characterize the context of the whole message;
3. Using a message tagging technique to reduce the impact of the control field overhead on network utilization; and/or
4. A uniform message encapsulation structure with less (e.g., a minimal set of) rules available to all protocols above the physical layer.

A packet network may include all functional layers above, except the physical layer. The physical layer is excluded because it may carry constraints related to the specific transmission medium. Unless the requirements of the physical medium dictate otherwise, all message transmissions follow the NPE framing and encapsulation rules.

Traditionally, messages sent via various protocols have been referred to by different terms such as frames and packets. Here, the term packet is used to refer to all messages that use the NPE format. Thus, one or more example embodiments may be applicable to packets, frames, etc. Moreover, as discussed herein, the terms message and packet may be used interchangeably.

According to one or more example embodiments, a message (or packet) may include one or more data units, which will be discussed in more detail below.

One or more example embodiments described herein provides a specification for NPE. The NPE representation provides agility and future safeness of the message encapsulation while at the same time providing a solid guideline for scalable messaging on a flat network architecture. The flat and open structure of the definition may enable the transparency of the network protocol operations.

FIG. 1 is a diagram illustrating an example high level structure of an NPE formatted data unit according to example embodiments.

Referring to FIG. 1, an NPE-formatted data unit (shortly "data unit" henceforth) includes three fields: type, length and value. As mentioned above, a message or packet may include one or more data units.

The type field 102 describes the kind of data unit (e.g., whether the data unit is grouped/classified as part of the connection group, the network function group or the application group) and the type instances for the data unit. In the example shown in FIG. 1, the type field 102 is 4 octets (32 bits) long.

The length field 104 determines the bit length of the value field 106. In this example, the length field 104 is 3 octets (24 bits) long.

The value field 106 includes the content or data (payload) of the data unit being transmitted.

Data units are grouped into at least three categories or groups. Example embodiments are discussed herein with regard to three categories: connection, network function, and application.

Figure 2:
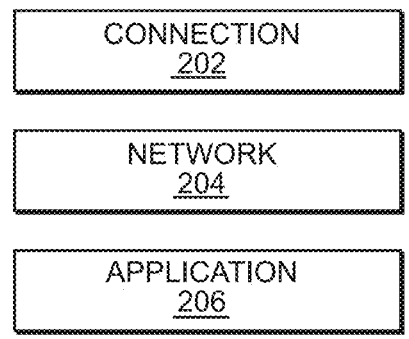
FIG. 2 is a diagram illustrating categories of data units according to example embodiments.

FIG. 2 is a diagram illustrating three categories of data units according to example embodiments.

Referring to FIG. 2, the categories include a connection group 202, a network function group (also referred to as a network group) 204 and an application group 206.

Data units in the connection group 202 may include, but are not limited to, for example, one or more of identifiers, routes or tags. Some of the data units in the connection group 202 may be mandatory data units included in all messages unless a shorter tag is used to represent the data units of the connection group 202 and network function group 204 (as described below).

Data units in the network function group 204 may include commands and information associated with packet transmission procedures and operation of the packet network. Examples of data units included in the network function group include, but are not limited to: a routing vector, a timestamp, a sequence number, a destination port, a source port, real-time protocol options, tunnel control options, etc. Example embodiments should not be limited to these examples.

Data units in the application group 206 may include, but are not limited to, representation of all data that is outside of the scope of packet transmission and operation of the packet network.

In a message, the data unit groups may be ordered in the sequence—connection, network, and application.

The instance of a network is designated by the value of the network identifier data unit (as described below).

According to one or more example embodiments, the size of the Value field in a data unit may be integer number of octets.

Figure 3:
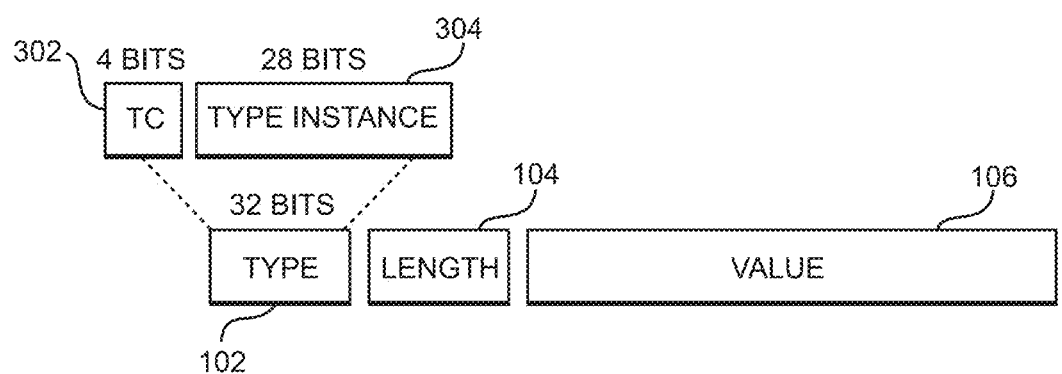
FIG. 3 illustrates an example structure of a type field according to example embodiments.

FIG. 3 illustrates an example structure of the type field 102 according to example embodiments.

Referring to FIG. 3, in this example, the first 4 bits of the type field 102 (identified as TC 302 in FIG. 3) identify the group or category of the data unit. In at least one example, the first 4 bits of the type field 102 may have the following values:
- 0000: connection
- 0001: network function
- 0010: application In this example, 4 bits are used to represent the three type-field groups and additional bits are reserved for possible future categorizations.

Still referring to FIG. 3, the remaining 28 bits of the type field 102 (identified as 304 in FIG. 3) identify the type instance. Examples of type instances include: a network identifier, a destination endpoint identifier, a source endpoint identifier, a flow tag, a routing vector, a timestamp, a sequence number, a destination port, a source port, real-time protocol options, tunnel control options, a file transfer, G711 audio stream, tunneled payload data, or the like. Example embodiments should not be limited to these examples.

For data units in the connection group, the following four data units appear first in a sequence of data units of a given message or set of messages: (i) Network identifier, (ii) Endpoint identifier for destination, (iii) Endpoint identifier for source, and (iv) Flow tag.

i. Network identifier: The network identifier data unit may be a representation of a specific technology domain, an administrative scope, an instance of a virtual network, or others. In one example, the type field 102 for the network identifier data unit may be set to 0x00000000. As described in more detail later with regard to FIG. 4, the network identifier may have a 32-bit value field with a standard format.

ii. Endpoint identifier for destination (destination endpoint identifier or destination identifier): The endpoint identifier for destination data unit is the address of the destination of the packet. In one example, the type field 102 for the endpoint identifier for destination data unit may be set to 0x00000001.

iii. Endpoint identifier for source (source endpoint identifier or source identifier): The endpoint identifier for source data unit is the address of the source of the packet. In one example, the type field 102 for the endpoint identifier for source data unit may be set to 0x00000002.

iv. Flow tag: The flow tag data unit has a value representing a universally unique identifier (e.g., a 128-bit number used to identify information in computer systems) that may be used as a pointer to the instance of all data units in the connection and network function groups. In one example, the type field 102 for the flow tag data unit may be set to 0x00000003.

After the above-mentioned four data units, the connection group 202, for example, may include one or more data units, such as network state, channel or routing vector data units as needed. According to at least some example embodiments, the data units may appear in the order discussed below. However, example embodiments should not be limited to this order.

i. Network state: The network state data unit includes information about network state updates or exception events having occurred in the network. The format and the length of the network state data unit may vary based on the network. In one example, the type field 102 of the network state data unit may be set to 0x00000004.

ii. Channel: The channel data unit represents the communication channel identifier within a shared physical medium. The format and the length of the value field of the channel data unit may vary based on the network. In one example, the type field 102 of the channel data unit may be set to 0x00000005.

iii. Routing vector: The routing vector data unit includes a set of identifiers for routing the packet within the packet network. The format and the length of the value field of the routing vector data unit may vary based on the network. In one example, the type field 102 of the routing vector data unit may be set to 0x00000006.

Although not specifically discussed herein, the connection group according to one or more example embodiments may include other data units based on the network. The other data units may be arranged in the sequence of data units after the optional fields listed above. In one example, the additional data units may include: telemetric data (real-time network status), a security token for secure communications, a timestamp for deterministic communications, a sequence number for reliable communications, etc.

According to one or more example embodiments, only few packets are expected to carry the full set of data units that belong to the connection and network function groups. After the first packet of the flow is transmitted by the source, only the flow tag data unit is sent as a pointer to the set of data units sent earlier, whereas the network identifier, the source identifier and the destination identifier are omitted from subsequent packets in the flow. The full set of data units that belong to the connection and network function groups may be repeated periodically (e.g., at regular intervals in full-header packets).

A learning algorithm may determine the periodicity of inclusion in a packet of the full set of data units belonging to the connection and network function groups, for example, by predicting pauses in flows to send full headers to suppress and/or minimize impact on low latency and/or low jitter packet timing.

In at least some example embodiments, the transmission interval for the full set of data units may be formulated as shown below:

$$n < \min\left(\lambda\tau, \frac{1}{r}\right)$$

$$H = (i \bmod n \neq 0)$$

wherein, i is the packet index in the flow; λ is the packet arrival rate in the flow; τ is the minimum time scale of control plane route updates; r is the packet loss rate; n is the full packet transmission interval; and H is the tagged packet transmission indicator function.

In one example, if a network event failure response time for route updates is greater than about 1 second and the flow packet inter-arrival time is about 20 ms, then the full-header packet should be sent more frequently than every 50 packets.

In another example, if the first packet of a flow is lost, and the packet is part of the application session initiation handshake, then the session may not start until the next full packet is transmitted. For example, if r=0.0001, λ=0.02, and n=50, then there would be about 0.01% probability of about a 1 second delay in session initiation. At least one example embodiment may apply various schemes to reduce the probability of session initiation delays due to the decimation of packets that carry the full set of data units of a flow.

In the above example, if the first two packets are sent with the full set of data units, the probability of delayed session initiation may drop to about 0.0001%. According to at least one other example embodiment, a destination or transit node may choose to send an "unknown tag" data unit back to the source node when dropping the tagged messages. With such a scheme, session initiation delay may be reduced to the packet inter-arrival interval of the flow, which is about 20 ms in the above example. At least one other example embodiment may use full-header packets until the source node receives the first indication that one full-header packet has reached its destination.

According to one or more example embodiments, the NPE flow tagging mechanism may resemble, in purpose, the "flow label" field of the Internet Protocol version 6 (IPv6). In IPv6, the flow label is intended to be used for selection of output ports. In NPE, flow tags have a wider and more important role. Flow tags are used to increase transmission efficiency and/or the efficiency of the complete packet forwarding process. Different example embodiments may choose to implement various flow tag-based improvements and/or optimizations. When forwarding tagged packets, nodes may hold per-tag state information, similar to label processing of Multi-Protocol Label Switching (MPLS). To assist flow tag state removal, according to one or more example embodiments, nodes may choose to implement and send a data unit of type "maximum flow tagged interval" to indicate the minimum time the forwarding nodes need to hold state for a flow tag, after which the memory record for the tag state may be removed.

Figure 4:
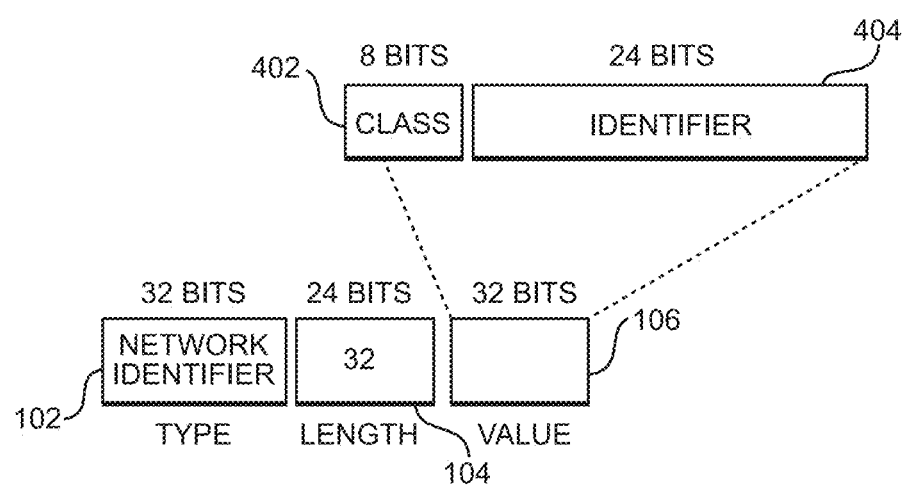
FIG. 4 is a diagram illustrating a network identifier data unit, according to example embodiments.

FIG. 4 is a diagram illustrating a network identifier data unit, according to example embodiments.

To facilitate accelerated data unit processing when identifying commonly used network instances, the value field 106 of the network identifier data unit with length of 32 bits may have a standard value field format as shown in FIG. 4.

Referring to FIG. 4, the first octet 402 of the value field 106 determines the class of the network identifier (e.g., public, private, IPv6, IPv4, etc.) and the remaining 3 octets (24 bits) 404 of the value field 106 are used as an identifier. The value range of the first octet 402 (also referred to as the class field) from 0x00 to 0xff is reserved, and the values of the remaining 3 octets 404 (referred to as the identifier field) will be assigned by numbering authorities. Network identifier formats of lengths other than 32 bits are not standardized.

In one example, if the first octet indicates an IPv6 network, then the identifier field may provide further details on optional fields, or the identifier field may indicate that the network is specific to one country region, or that the network is related to the next generation Internet semantics.

Data units in the network function group may be defined and set by the protocol(s) that are controlling the packet being transmitted. As mentioned above, examples of data units included in the network function group include, but are not limited to: a timestamp, a sequence number, a destination port, a source port, real-time protocol options, tunnel control options, etc. Example embodiments should not be limited to these examples.

Data units in the application group may be defined and set by the application utilizing the network services associated with the packet being transmitted. Example applications include multimedia (e.g., audio and/or video), Voice over Internet Protocol (VoIP), messaging, email, or any other application that may utilize packet communications networks.

According to example embodiments, network functions involved in forwarding packets may add or remove data fields related to the procedures of the network protocols that are being executed. Network functions involved in forwarding packets may not change the order of the existing data units that are not within their scope of control.

None of the fields of the mandatory data units in the connection group may be encrypted (e.g., network identifier, source identifier, destination identifier, and flow tag) and none of the type and length fields of data units may be encrypted.

Example packet transmission scenarios are provided below. In connection with the examples discussed below, the following abbreviations are used for readability:
NID—network identifier
EID—destination endpoint identifier
SID—source endpoint identifier
TAG—flow tag
RVEC—routing vector
TS—timestamp
SNUM—sequence number
DPORT—destination port
SPORT—source port
RTP—real-time protocol options
TUNH—tunnel control options
FILE—file transfer
G711—G711 audio stream
TUNP—tunneled payload In the tables below, the group is shown explicitly in the tables for the sake of clarity.

Table 1 shows contents of a packet (or message) on a link between two directly connected nodes in a network. As shown in Table 1, the first packet includes 4 connection group data units (types: NID, EID, SID and TAG), three network function data units (types: DPORT, SPORT and SNUM) and an application group data unit (type: FILE).

TABLE 1

| Group | Type | Length (bits) | Value |
|---|---|---|---|
| Connection | NID | 32 | private IPv6 network |
| Connection | EID | 128 | fe80::42:84ff:fe4e:2c90 |

TABLE 1-continued

| Group | Type | Length (bits) | Value |
|---|---|---|---|
| Connection | SID | 128 | fe80::64d7:8817:88b8:8bca |
| Connection | TAG | 128 | 19153306-3ded-11e9-b210-d663bd873d93 |
| Network Function | DPORT | 16 | 1024 |
| Network Function | SPORT | 16 | 2048 |
| Network Function | SNUM | 32 | 1 |
| Application | FILE | 72000 | ... |

Table 2 shows content of second and subsequent packets (after the first packet in Table 1) on the link between the two directly connected nodes in the network.

TABLE 2

| Group | Type | Length | Value |
|---|---|---|---|
| Connection | TAG | 128 | 19153306-3ded-11e9-b210-d663bd873d93 |
| Network Function | SNUM | 32 | 2 |
| Application | FILE | 72000 | ... |

Table 3 shows example content of a first voice stream packet sent between two endpoints on a public network.

TABLE 3

| Group | Type | Length | Value |
|---|---|---|---|
| Connection | NID | 32 | public IPv6 network |
| Connection | EID | 128 | 2001:db8::1 |
| Connection | SID | 128 | 2001:db8::2 |
| Connection | TAG | 128 | 19153306-3ded-11e9-b210-d663bd873d94 |
| Network Function | RTP | 48 | ... RTP options ... |
| Network Function | SNUM | 16 | 1 |
| Network Function | TS | 32 | 1249872211 |
| Application | G711 | 1280 | ... |

Table 4 shows content of second and subsequent voice stream packets (after the first voice stream packet in Table 3) sent between the two endpoints on the public network.

TABLE 4

| Group | Type | Length | Value |
|---|---|---|---|
| Connection | TAG | 128 | 19153306-3ded-11e9-b210-d663bd873d94 |
| Network Function | SNUM | 16 | 2 |
| Network Function | TS | 32 | 1249892211 |
| Application | G711 | 1280 | ... |

Table 5 illustrates a first private network packet tunneled over a public network transport.

TABLE 5

| Group | Type | Length | Value |
|---|---|---|---|
| Connection | NID | 32 | public IPv6 network |
| Connection | EID | 128 | 2001:db8::3 |
| Connection | SID | 128 | 2001:db8::4 |
| Connection | TAG | 128 | 19153306-3ded-11e9-b210-d663bd873d95 |
| Connection | RVEC | 640 | ... |
| Network Function | TUNH | 48 | ... |
| Application | TUNP | 1400 | ... |

Table 6 shows content of second and subsequent private network packets (after the first private network packet in Table 5) tunneled over the public network transport.

TABLE 6

| Group | Type | Length | Value |
|---|---|---|---|
| Connection | TAG | 128 | 19153306-3ded-11e9-b210-d663bd873d95 |
| Application | TUNP | 1400 | ... |

Figure 5:
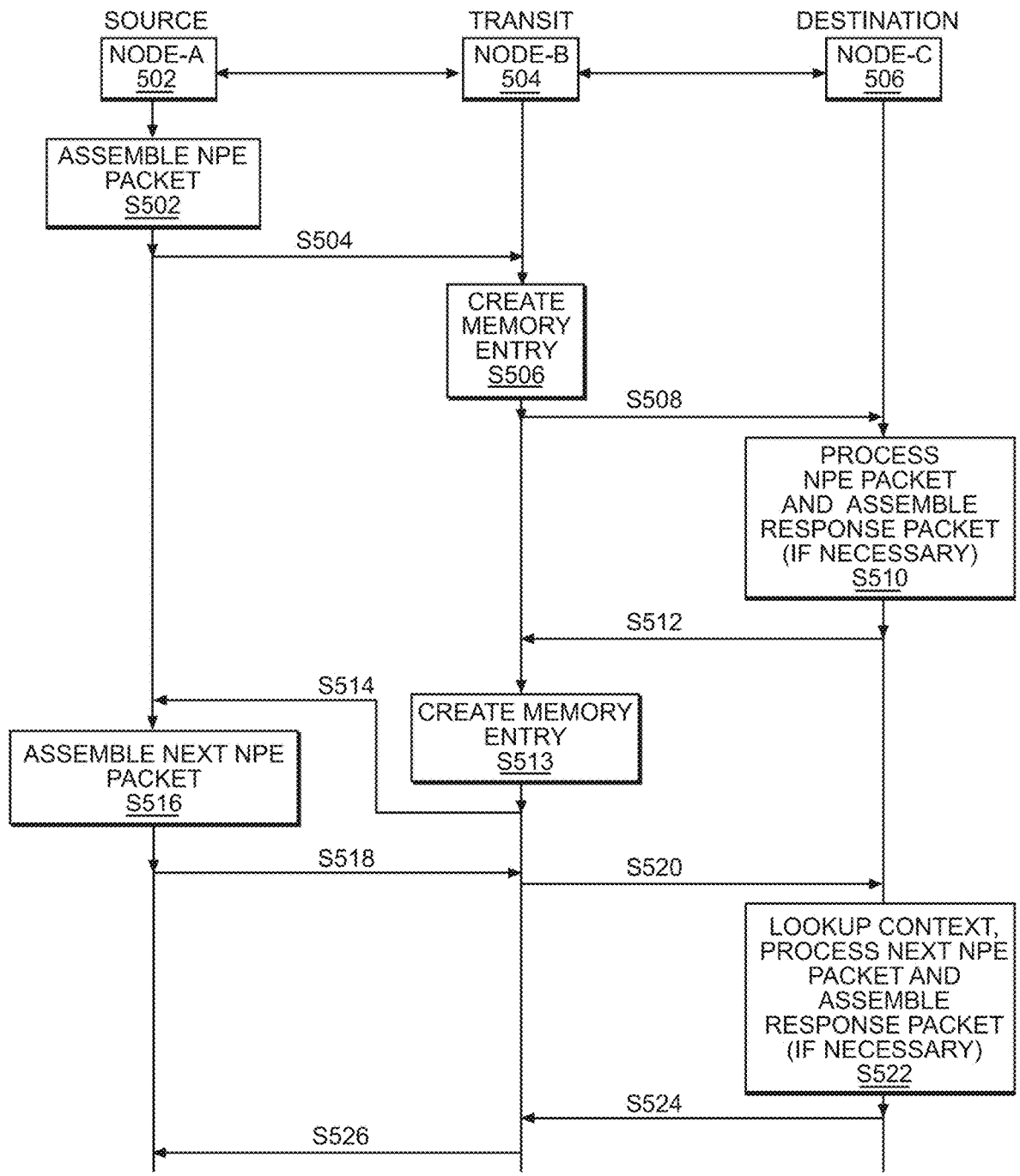
FIG. 5 is a signal flow diagram illustrating an implementation of a private network instance implementing universal-NPE-based messaging according to example embodiments.

FIG. 5 is a signal flow diagram illustrating an example implementation of a private network instance using NPE-based messaging according to example embodiments.

Referring to FIG. 5, the private network instance includes Node-A (Source Node) 502 in two-way communication with Node-B (Transit Node) 504, which is in two-way communication with Node-C (Destination Node) 506.

To send a message to Node-C 506, at S502 Node-A 502 assembles an NPE packet. In assembling the NPE packet, Node-A 502 sets the content of the network identifier data unit to indicate a private network that is known to all nodes in the network. Node-A 502 also sets the destination identifier data unit to the network identity of Node-C 506 and sets the source identifier data unit to the network identity of Node-A 502. Node-A 502 also generates a universally unique identifier for the message flow, and places the generated universally unique identifier in the flow tag data unit. The remaining data units are populated according to the application and the type of network protocol that will be used (such as secure and reliable session) to send packets between Node-A 502 and Node-C 506.

Based on the topology of the network, at S504 Node-A 502 sends the packet to Node-B 504.

At S506, Node-B 504 creates a memory entry for the message flow that is identified by the flow tag value (e.g., universally unique identifier for the message flow) as the key. Based on the routing information of the network, at S508 Node-B 504 forwards the packet to Node-C 506 modifying only the Time To Live (TTL) data unit in the packet from Node-A 502.

At S510, Node-C 506 processes the NPE packet and (if required by the acting network protocol) assembles a response message (also a NPE packet) in response to the NPE packet from Node-A 502. In so doing, Node-C 506 may set the content of the network identifier data unit to indicate the private network that is known to all nodes in the network, set the destination identifier data unit to the network identity of Node-A 502, set the source identifier data unit to the network identity of Node-C 506, and generate another universally unique identifier for the message flow back to Node-A 502. Node-C 506 includes this universally unique identifier as a new flow tag value in the flow tag data unit included in the response message.

Based on the topology of the network, at S512 Node-C 506 sends the packet to Node-B 504.

At S513, Node-B 504 creates a memory entry for the message flow that is identified by the flow tag value (universally unique identifier) included in the response message from Node-C 506. And, based on the routing information of the network, at S514 Node-B 504 forwards the packet to Node-A 502 without modifying any of the data units in the response message from Node-A 502.

As part of the same session flow from Node-A 502 to Node-C 506, at S516 Node-A 502 assembles a next NPE packet for transmission to Node-C 506. This time, Node-A 502 assembles the NPE packet including (e.g., only) the flow tag data unit from the connection group along with the network function and the application data units, but omits the network identifier, source identifier or destination identifier data units. Node-A 502 then sends the next NPE packet to Node-B 504 at S518.

When Node-B 504 receives the next NPE packet with the flow tag data unit, Node-B 504 looks up the saved local context in the memory (memory entry for the message flow generated at S506) and forwards the packet to the same output port as with the previous message (e.g., from Node-A 502) in the same flow at S520.

When Node-C 506 receives the next NPE packet with only the flow tag, at S522 Node-C 506 looks up the context and processes the next NPE packet in the same or substantially the same manner as the previous NPE packet from Node-A 502 in the same flow. If deemed necessary, Node-C 506 may again assemble a response message. This time, Node-C 506 assembles the response message (also a NPE packet) including (e.g., only) the flow tag data unit from the connection group (generated at S510 and included with the prior response message) along with the network function and the application data units, but omits the network identifier, source identifier or destination identifier data units included in the previous response message.

Node-C 506 then sends the next response message to Node-B 504 at S524.

When Node-B 504 receives the next response message, Node-B 504 looks up the saved local context in the memory (memory entry for the message flow generated at S513) and forwards the packet to the same output port as with the previous message (e.g., from Node-C 506) in the same flow at S526.

The communication may continue between Node-A 502 and Node-C 506 in a similar or the same way as discussed above with regard to S516-S526 until the session flow is terminated by the application, Node-A 502 or Node-C 506.

Figure 6:
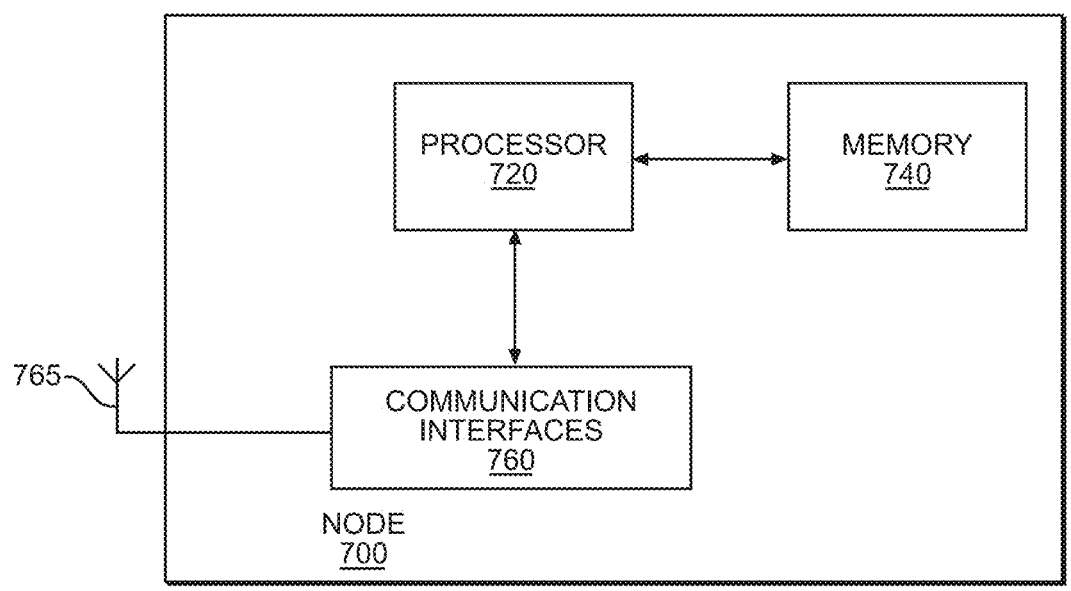
FIG. 6 illustrates an example embodiment of a network node.

FIG. 6 illustrates an example embodiment of a network node. The network node shown in FIG. 6 may serve as one or more of the network nodes shown in FIG. 5.

As shown, the network node 700 includes: a memory 740; a processor 720 connected to the memory 740; various interfaces 760 connected to the processor 720; and one or more antennas or antenna panels 765 connected to the various interfaces 760. The various interfaces 760 and/or the antenna 765 may constitute a transceiver for transmitting/receiving data from/to other network nodes and/or LANs via a wired or wireless links. As will be appreciated, depending on the implementation of the network node 700, the network node 700 may include many more components than those shown in FIG. 6. However, it is not necessary that all of these generally conventional components be shown in order to disclose the illustrative example embodiment.

The memory 740 may be a computer readable storage medium that generally includes a random access memory (RAM), read only memory (ROM), and/or a permanent mass storage device, such as a disk drive. The memory 740 also stores an operating system and any other routines/modules/applications for providing the functionalities of the network node 700 (e.g., functionalities of a network node, such as a router, a switch, etc., methods according to the example embodiments, etc.) to be executed by the processor 720. These software components may also be loaded from a separate computer readable storage medium into the memory 740 using a drive mechanism (not shown). Such separate computer readable storage medium may include a disc, tape, DVD/CD-ROM drive, memory card, or other like computer readable storage medium (not shown). In some example embodiments, software components may be loaded into the memory 740 via one of the various interfaces 760, rather than via a computer readable storage medium.

The processor 720 may be configured to carry out instructions of a computer program by performing the arithmetical, logical, and input/output operations of the system. Instructions may be provided to the processor 720 by the memory 740.

The various interfaces 760 may include components that interface the processor 720 with the antenna 765, or other input/output components. As will be understood, the various interfaces 760 and programs stored in the memory 740 to set forth the special purpose functionalities of the network node 700 will vary depending on the implementation of the network node 700.

The interfaces 760 may also include one or more user input devices (e.g., a keyboard, a keypad, a mouse, or the like) and user output devices (e.g., a display, a speaker, or the like).

Driven by the Open Systems Interconnection (OSI) and DoD layered models, Ethernet, Internet Protocol (IP), and Transmission Control Protocol (TCP) protocols evolved isolated in their own dimensions while being operated concurrently with many redundancies, such as with identifiers, checksums, and Quality of Service (QoS) control attributes. This restricted cross-layer intelligence, made scaling relatively difficult, made quick reaction to changes relatively difficult, made quick recovery on failures relatively difficult, and made service level optimization relatively difficult. Multi-layering of protocols with very similar functional scope also works against efficiency—processing the same packet for the same reason in multiple layers of the protocol stacks.

One or more example embodiments may allow creation and/or deployment of network protocols that may scale end-to-end and/or support ultra-low latency requirements without needing layers of protocol stacks with redundant functionality.

One or more example embodiments provide message encapsulation flexibility that may allow protocols to express all or substantially all necessary information for improvement and/or optimization procedures.

One or more example embodiments may allow explicit identification of virtual network and/or network slice instances.

One or more example embodiments may provide improved throughput efficiency via message tagging to summarize control headers.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing network elements, data servers, network resource controllers, clients, routers, gateways, network nodes, computers, cloud-based servers, web servers, application servers, proxies or proxy servers, or the like. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUs), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a network element or network device to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

Although example embodiments are discussed herein with regard to data servers, network devices may also include be network elements such as network resource controllers, clients, routers, gateways, network nodes, computers, cloud-based servers, web servers, application servers, proxies or proxy servers, or the like.

According to example embodiments, network elements, network devices, data servers, network resource controllers, clients, routers, gateways, network nodes, computers, cloud-based servers, web servers, application servers, proxies or proxy servers, or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

What is claimed is:

1. A method for packet transmission between a source node and a destination node in a packet network, the method comprising:
    assembling at least a first packet including a plurality of data units, each of the plurality of data units being grouped into one of a connection group, a network function group or an application group, the network function group including at least two data units of the plurality of data units, the network function group including commands associated with packet transmission procedures and operation of the packet network and information associated with packet transmission procedures and operation of the packet network, and the connection group including at least one of identifiers, routes or tags associated with a flow of the first packet; and
    transmitting the first packet to the destination node, wherein
        the plurality of data units included in the first packet include at least a network identifier data unit, a destination endpoint identifier data unit, a source endpoint identifier data unit, a flow tag data unit, and at least one of a network state data unit, a channel data unit or a routing vector data unit,
        the plurality of data units are arranged as a sequence of data units, and
        the at least one of the network state data unit, the channel data unit or the routing vector data unit are arranged after the network identifier data unit, the destination endpoint identifier data unit, the source endpoint identifier data unit and the flow tag data unit in the sequence of data units.

2. The method of claim 1, wherein each data unit, among the plurality of data units, comprises:
    a type field indicating whether the data unit is grouped into the connection group, the network function group or the application group;
    a length field indicating a bit length of a value field; and
    the value field including a payload of the data unit.

3. The method of claim 2, wherein the type field identifies a type instance of the data unit.

4. The method of claim 1, wherein
    the first packet is an initial packet transmitted from the source node to the destination node.

5. The method of claim 4, further comprising:
    assembling a second packet for transmission to the destination node, wherein
        the second packet includes the flow tag data unit, and
        the second packet does not include the network identifier data unit, the destination endpoint identifier data unit or the source endpoint identifier data unit; and
    transmitting the second packet to the destination node.

6. The method of claim 5, wherein
    the flow tag data unit included in the second packet includes a flow tag identifying a packet flow including the first packet and the second packet; and
    the method further includes receiving an unknown tag response from the destination node, the unknown tag response indicating that a record corresponding to the flow tag included in the second packet does not exist at the destination node.

7. The method of claim 1, wherein
    the connection group includes at least one data unit of the plurality of data units, and
    the application group includes at least one data unit of the plurality of data units.

8. A method for packet transmission between a source node and a destination node in a packet network, the method comprising:
    assembling at least a first packet including a plurality of data units, each of the plurality of data units being grouped into one of a connection group, a network function group or an application group, the network function group including at least two data units of the plurality of data units, the network function group including commands associated with packet transmission procedures and operation of the packet network and information associated with packet transmission procedures and operation of the packet network, and the connection group including at least one of identifiers, routes or tag associated with a flow of the first packet; and
    transmitting the first packet to the destination node,
    wherein the first packet is an initial packet transmitted from the source node to the destination node,
    wherein the plurality of data units included in the first packet include at least a network identifier data unit, a destination endpoint identifier data unit, a source endpoint identifier data unit and a flow tag data unit,
    wherein the method further comprises
        assembling a second packet for transmission to the destination node, wherein the second packet includes the flow tag data unit, and the second packet does not include the network identifier data unit, the destination endpoint identifier data unit or the source endpoint identifier data unit, and
        transmitting the second packet to the destination node,
    wherein the flow tag data unit included in the second packet includes a flow tag identifying a packet flow including the first packet and the second packet, and wherein the method further includes receiving an unknown tag response from the destination node, the unknown tag response indicating that a record corresponding to the flow tag included in the second packet does not exist at the destination node.

9. A network node configured to transmit packets to a destination node in a packet network, the network node comprising:
at least one processor; and
at least one memory including computer program code, the at least one memory and the computer program code configured to, with the at least one processor, cause the network node to
assemble at least a first packet including a plurality of data units, each of the plurality of data units being grouped into one of a connection group, a network function group or an application group, the network function group including at least two data units of the plurality of data units, the network function group including commands associated with packet transmission procedures and operation of the packet network and information associated with packet transmission procedures and operation of the packet network, and the connection group including at least one of identifiers, routes or tags associated with a flow of the first packet; and
transmit the first packet to the destination node, wherein
the plurality of data units included in the first packet include at least a network identifier data unit, a destination endpoint identifier data unit, a source endpoint identifier data unit, a flow tag data unit, and at least one of a network state data unit, a channel data unit or a routing vector data unit,
the plurality of data units is arranged as a sequence of data units, and
the at least one of the network state data unit, the channel data unit or the routing vector data unit are arranged after the network identifier data unit, the destination endpoint identifier data unit, the source endpoint identifier data unit and the flow tag data unit in the sequence of data units.

10. The network node of claim 9, wherein each data unit, among the plurality of data units, comprise:
a type field indicating whether the data unit is grouped into the connection group, the network function group or the application group;
a length field indicating a bit length of a value field; and
the value field including a payload of the data unit.

11. The network node of claim 10, wherein the type field identifies a type instance of the data unit.

12. The network node of claim 9, wherein data units in the connection group include at least one of identifiers, routes or tags associated with a flow of packets between the network node and the destination node.

13. The network node of claim 9, wherein
the first packet is an initial packet transmitted from the network node to the destination node.

14. The network node of claim 9, wherein the at least one memory and the computer program code are configured to, with the at least one processor, cause the network node to
assemble a second packet for transmission to the destination node, wherein
the second packet includes the flow tag data unit, and
the second packet does not include the network identifier data unit, the destination endpoint identifier data unit or the source endpoint identifier data unit, and
transmit the second packet to the destination node.

15. The network node of claim 14, wherein
the flow tag data unit included in the second packet includes a flow tag identifying a packet flow including the first packet and the second packet; and
the at least one memory and the computer program code are configured to, with the at least one processor, cause the network node to receive an unknown tag response from the destination node, the unknown tag response indicating that a record corresponding to the flow tag included in the second packet does not exist at the destination node.

16. A network node configured to transmit packets to a destination node in a packet network, the network node comprising:
at least one processor; and
at least one memory including computer program code, the at least one memory and the computer program code configured to, with the at least one processor, cause the network node to
assemble at least a first packet including a plurality of data units, each of the plurality of data units being grouped into one of a connection group, a network function group or an application group, the network function group including at least two data units of the plurality of data units, the network function group including commands associated with packet transmission procedures and operation of the packet network and information associated with packet transmission procedures and operation of the packet network, and the connection group including at least one of identifiers, routes or tags associated with a flow of the first packet, and
transmit the first packet to the destination node
wherein each data unit, among the plurality of data units, comprise:
a type field indicating whether the data unit is grouped into the connection group, the network function group or the application group,
a length field indicating a bit length of a value field, and
the value field including a payload of the data unit,
wherein the first packet is an initial packet transmitted from the network node to the destination node, and
wherein the plurality of data units included in the first packet include at least a network identifier data unit, a destination endpoint identifier data unit, a source endpoint identifier data unit and a flow tag data unit,
wherein the at least one memory and the computer program code are further configured to, with the at least one processor, cause the network node
to assemble a second packet for transmission to the destination node, wherein the second packet includes the flow tag data unit, and the second packet does not include the network identifier data unit, the destination endpoint identifier data unit or the source endpoint identifier data unit,
transmit the second packet to the destination node,
wherein the flow tag data unit included in the second packet includes a flow tag identifying a packet flow including the first packet and the second packet, and
the at least one memory and the computer program code are further configured to, with the at least one processor, cause the network node to receive an unknown tag response from the destination node, the unknown tag response indicating that a record corresponding to the flow tag included in the second packet does not exist at the destination node.

17. A non-transitory computer-readable medium storing computer-executable instructions that, when executed by at least one processor at a network node, cause the network node to perform a method for packet transmission between the network node and a destination node in a packet network, the method comprising:

assembling at least a first packet including a plurality of data units, each of the plurality of data units being grouped into one of a connection group, a network function group or an application group, the network function group including at least two data units of the plurality of data units, the network function group including commands associated with packet transmission procedures and operation of the packet network and information associated with packet transmission procedures and operation of the packet network, and the connection group including at least one of identifiers, routes or tags associated with a flow of the first packet; and transmitting the first packet to the destination node, wherein the plurality of data units included in the first packet include at least a network identifier data unit, a destination endpoint identifier data unit, a source endpoint identifier data unit, a flow tag data unit, and at least one of a network state data unit, a channel data unit or a routing vector data unit, the plurality of data units are arranged as a sequence of data units, and the at least one of the network state data unit, the channel data unit or the routing vector data unit are arranged after the network identifier data unit, the destination endpoint identifier data unit, the source endpoint identifier data unit and the flow tam data unit in the sequence of data units.

18. The non-transitory computer-readable medium of claim 17, wherein each data unit, among the plurality of data units, comprises:

a type field indicating whether the data unit is grouped into the connection group, the network function group or the application group;

a length field indicating a bit length of a value field; and the value field including a payload of the data unit.

19. The non-transitory computer-readable medium of claim 17, wherein the first packet is an initial packet transmitted from the network node to the destination node.

20. The non-transitory computer-readable medium of claim 19, wherein the method further comprise:

assembling a second packet for transmission to the destination node, wherein the second packet includes the flow tag data unit, and the second packet does not include the network identifier data unit, the destination endpoint identifier data unit or the source endpoint identifier data unit; and transmitting the second packet to the destination node.

* * * * *